May 12, 1925.
J. W. WINTER
1,537,722
PIPE CONNECTION FOR CONTAINERS
Filed July 28, 1923
2 Sheets-Sheet 1
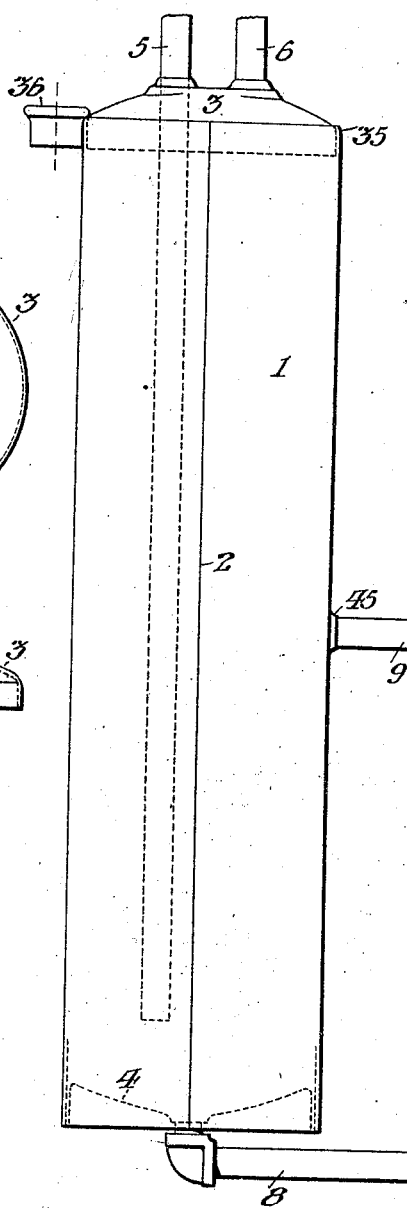
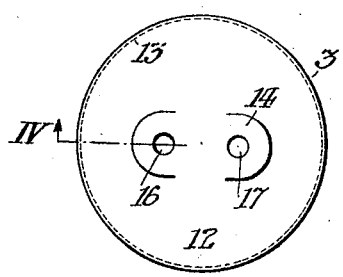
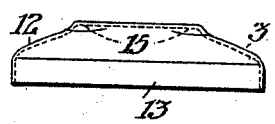
INVENTOR:
JOSEPH WILLIAM WINTER May 12, 1925.
J. W. WINTER
PIPE CONNECTION FOR CONTAINERS
Filed July 28, 1923
1,537,722
2 Sheets-Sheet 2
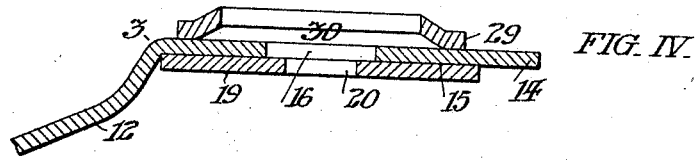
FIG. IV.
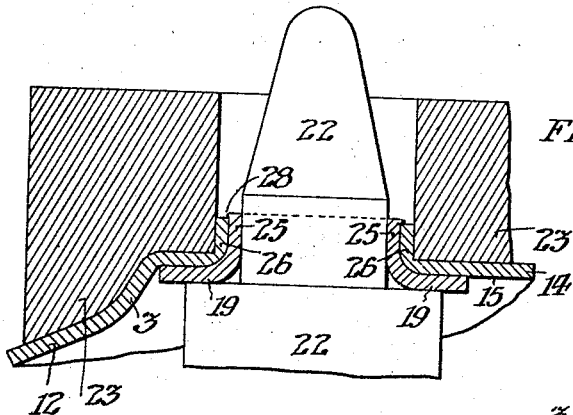
FIG. V.
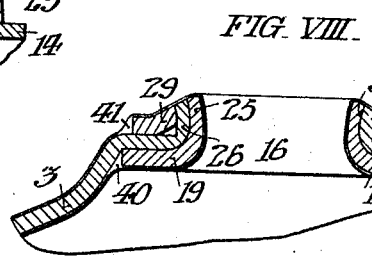
FIG. VIII.
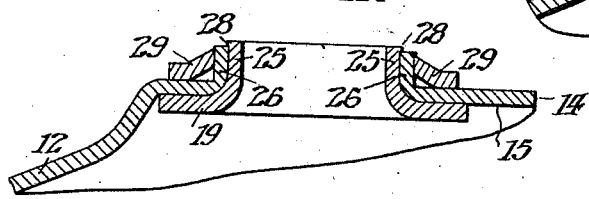
FIG. VI.
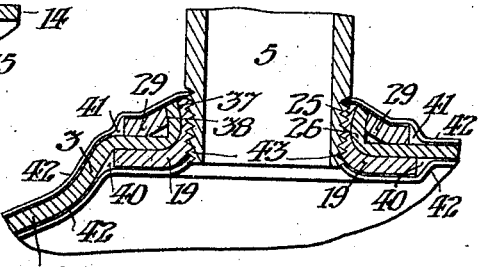
FIG. IX.
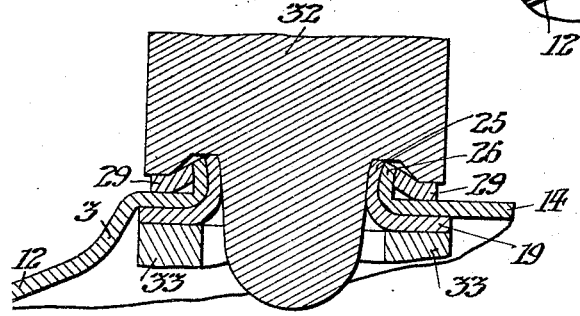
FIG. VII.
INVENTOR:
JOSEPH WILLIAM WINTER
Arthur E. Paige
Attorney.

Patented May 12, 1925.

1,537,722

UNITED STATES PATENT OFFICE.

JOSEPH WILLIAM WINTER, OF PENFIELD, PENNSYLVANIA.

PIPE CONNECTION FOR CONTAINERS.

Application filed July 28, 1923. Serial No. 654,354.

*To all whom it may concern:*

Be it known that I, JOSEPH WILLIAM WINTER, a citizen of the United States, residing at Penfield, in the county of Delaware and State of Pennsylvania, have invented a certain new and useful Improvement in Pipe Connections for Containers, whereof the following is a specification, reference being had to the accompanying drawings.

My invention is particularly applicable to containers of the type known as "range boilers", i. e., water tanks provided with pipe fittings for inclusion in a water circulating system with a kitchen range waterback, or other water heating means. Such containers include a cylindrical tubular body or shell having opposite end closures and provided with means for screw threaded connection with ordinary water pipes through which water is circulated to and from the water chamber within the container. My improvement relates particularly to the method of and means for providing such a container with suitable pipe connecting means.

Heretofore, it has been the ordinary practice to provide such containers with what are known to the trade as "spuds", to wit, annular pieces of cast or wrought metal which are riveted or otherwise secured at openings in the container shell or its opposite end closures, or both; which spuds are screw threaded to engage the pipes aforesaid. Such devices of the prior art are unsatisfactory, in that it is not only difficult to make a tight joint between the primarily separate metal of the spud and the metal of the container shell or closure, but even after such a joint is made water-tight; it may be caused to leak under the stress to which the spud is subjected when a pipe is screwed into it; such stresses, of course, tending to twist the spud in its seat in the container wall. Moreover, as the screw threading operation is the last performed upon the container after the latter has been brazed at its joint and galvanized or otherwise coated inside and outside with alloy which is principally zinc; it is impossible to discover defects in the spuds at the portions thereof where the screw threads must be cut, until such final screw threading operation, and it may be then discovered that some spud in the container is so defective that a tight screw threaded connection cannot be made therewith, and the entire container must be scrapped because of such defect.

Therefore, it is the object of my invention to avoid the defects aforesaid by providing two wrought metal reinforcements at each region of the container where it must be screw threaded for a pipe connection, and of such character that the reinforcements become an integral part of the container without any possibility of development of such defects as above noted with respect to the devices of the prior art.

As hereinafter described; one such reinforcement is applied inside the container wall and the other outside. The inside reinforcement is primarily a plane annular plate washer, conveniently punched from a stock sheet of rolled steel. Such reinforcement is applied in registry with an opening in the container wall and, thereupon, both metal of the reinforcement and of the wall itself, are distorted together, outwardly, from what is to be ultimately the inside of the container: so that said annular reinforcing plate is deformed at its central portion to form an outwardly extending tubular cone within a corresponding conical deformation in the container wall; preferably with the tubular portion of said reinforcement extending through the tubular portion of the wall thus formed, and expanded exterior to said wall, so as to immediately permanently engage that reinforcement with the wall without other means. That operation leaves the structure with an opening which is conically convergent outwardly with respect to the container, whereas, it is desired to provide it with a pipe screw thread which is conically convergent inwardly with respect to the container. Therefore, it has been the practice of our assignee, in accordance with the invention of Victor Mauck described in copending application Serial 615,278, to conically ream such reinforced openings for the introduction of screw threading tools. However, such reaming is not only costly, but removes and wastes a portion of the metal which it would be preferable to retain and utilize. Therefore, I prefer to make such openings conform to the direction of convergence of said thread, without reaming. Moreover, as such inner reinforcements must be made of extremely ductile metal; it is desirable to reinforce the outer ends thereof against the tendency to spread when the pipes are screwed therein. Therefore, I provide the second reinforcing member at the outer end of said tubular portion of the inner reinforcement, as a washer, pressed from a plane sheet of steel, so that it is dished, with its circular edge, which is radially inward, axially outward, with respect to said tubular portion of the container wall and fitted around the latter, so that said tubular portion extends slightly therethrough. Thereupon, the metal of the tubular portions of the inner reinforcement and of said wall, and said outer reinforcement, are distorted together, so that the inner wall of the opening is rendered conically convergent inwardly and said tubular portion of the container is expanded at its outer end into permanent engagement with the outer reinforcement; so that both reinforcements are thus permanently rigidly connected with the wall of the container.

Thereafter, the portion of the container provided with said reinforcements is brazed, conveniently by dipping it into a bath of suitable molten alloy and, thereafter, the container, complete except for screw threading, is dipped in a molten bath of a coating alloy until the metal of the container is coated both inside and outside and, thereafter, provided with suitable pipe threads at each of the openings formed as above described.

My invention includes the various novel features of construction, arrangement and procedure hereinafter more definitely specified.

In said drawings: Fig. I is an elevation of a container of the range boiler type, embodying my invention.

Fig. II is a plan view of the upper end closure of said container.

Fig. III is a side elevation of said closure, shown in Fig. II.

Fig. IV is a fragmentary radial sectional view taken on the line IV in Fig. II, diametrically with respect to one of the openings in said container closure and showing two reinforcement blanks which are to be connected therewith in coaxial relation.

Fig. V is a fragmentary sectional view, similar to Fig. IV, but showing the metal of the container closure and its inner reinforcement deformed by suitable die elements to form a tubular conical socket extending outwardly with respect to the interior of the container.

Fig. VI is a fragmentary sectional view of said container closure and its inner reinforcement, similar to Fig. V, but with the outer reinforcement blank applied thereto, preliminary to the second operation.

Fig. VII is a fragmentary sectional view, similar to Fig. VI, but showing the metal of said container closure and both its reinforcements deformed by suitable die elements to form a tubular conical socket which is inwardly convergent with respect to the container.

Fig. VIII is a fragmentary sectional view of said container closure and its reinforcements, similar to Fig. VII, but after the structure has been brazed.

Fig. IX is a fragmentary sectional view similar to Fig. VIII, but with the structure in its final screw threaded form, and indicating a water pipe connected therewith.

Referring to Fig. 1; the container includes the cylindrical tubular body or shell 1, which is conveniently formed of a primarily flat sheet of steel, or other ferric metal, which is rolled to form a cylinder with edges abutting at the line 2, where said edges are electrically or otherwise welded to form a water-tight joint. Said container 1 is provided with the upper end closure 3 and lower end closure 4. Said closure 3 is provided with the cold water inlet pipe 5, in communication with the municipal supply, and the hot water outlet pipe 6 leading to the dispensing fixtures. Said container 1 is provided with the cold water outlet pipe 8 and the hot water inlet pipe 9, respectively leading to and from the range water-back 10, or other water heating means. Said pipe 8 is connected with said bottom closure 4, and said pipe 9 is connected with the side wall of the container 1, as shown.

I find it convenient to explain my invention with reference to the upper end closure 3 of said container 1. Said closure 3 is conveniently pressed to the peculiar form shown in Figs. II and III from a primarily flat sheet of steel or other ferric metal, and includes the convex web 12 having the cylindrical rim flange 13 in unitary relation therewith. Said closure web 12 has a principally plane panel 14 pressed therein, of the configuration indicated in Fig. II, with rounded edges merging into the convex surface of said web 12, as indicated in Fig. III, and forming a plane reinforcement seat 15. Two holes, 16 and 17, are punched through the metal of said closure 3 during the operation of forming the latter, and at the regions where it is desired to connect said pipes 5 and 6. However, as indicated, those openings are primarily much smaller in diameter than said pipes.

Respective annular plane reinforcing plates or washers 19, of the configuration indicated in Fig. IV, each having a central hole 20, of smaller diameter than the respective closure holes 16 and 17, are respectively applied in registry with said holes, upon said seat 15, at the inner surface of said closure 3, as indicated in Fig. IV. The two reinforcements 19 and the adjacent container wall metal of said closure 3 are then, preferably simultaneously, subjected to a pressing drawing operation, conveniently by means of the pair of die members 22 and 23 indicated in Fig. V, which cooperate to deform the metal of said closure 3, and its reinforcements, together, and outwardly from what is to be ultimately the inside of the container 1, so that each annular reinforcing plate 19 is drawn at its central portion to form an outwardly extending tubular cone 25, within a corresponding tubular cone 26 in the metal of said container closure 3.

As indicated in Fig. V; I prefer to so proportion the opening 20 in each reinforcement 19, with respect to the opening 16 or 17 in the closure 3, that when the metal of those parts is deformed, together, as above described, the tubular portion 25 of each reinforcement 19 extends through the tubular portion 26 of the closure wall; with the result that as the metal of said reinforcements is under compression during such deformation, it expands exterior to the metal of said closure, as indicated at 28 in Fig. V, so as to permanently interlock each reinforcement with the metal of its container wall, comprised in said closure 3, without other connecting means; so that each annular reinforcement 19 immediately becomes an integral part of the container structure as the result of the first operation upon it in connection with such structure.

Respective annular reinforcing plates or washers 29 are punched and pressed from primarily plane sheet metal to the dished configuration shown in Fig. IV, each having a central hole 30 fitted to slip over the tubular portions 26 of said closure wall 3, and are respectively applied in registry with said holes 16 and 17 around the respective tubular portions 26, as indicated in Fig. VI. The two reinforcements 29 and the adjacent container wall metal of the closure 3 and the tubularly extending metal of the reinforcements 19 are then, preferably simultaneously, subjected to a pressing drawing operation, conveniently by means of the pair of die members 32 and 33 indicated in Fig. VII, which cooperate to deform the metal of said closure 3 and its reinforcements 19 and 29, together, so that the inner walls of the openings 16 and 17 thus reinforced are rendered conically convergent inwardly; the outer ends of the tubular portions 26 of the container closure 3 being thus expanded into permanent engagement with the outer reinforcements 29; so that both the reinforcements 19 and 29 are thus permanently rigidly connected with the wall of the container.

However, in proceeding with the manufacture of such a container as indicated at 1 in Fig. I; I push the closure 3 into the cylindrical shell of the container until said shell overlaps the cylindrical skirt flange 13 on said closure 3 far enough to be rolled over the same, as indicated at 35 in Fig. I. Such rolling operation may be conveniently effected by rotation of the container in contact with the roller 36 indicated in Fig. I.

Preparatory to brazing the structure thus assembled; I clean the metal at the regions which are to be brazed, by any suitable means, for instance, by immersing such metal in a detergent liquid which removes all grease and dirt therefrom. I then preheat both the closure 3 and the adjacent portion of the cylinder shell of the container 1, preferably to a visible red, and then invert and dip both the container shell 1 and its closure 3 into a molten bath of brazing alloy, to a depth sufficient to submerge said closure flange 13 in said bath. I find it convenient to form such brazing alloy of fifty parts of copper and fifty parts of zinc, and to maintain the same at a temperature of from 1750 to 1800° F., during the brazing operation; with a suitable flux, such as borax, molten upon the surface of the bath; so that the structure dipped therein is coated with such flux as it enters the brazing metal. The effect of such operation is to cause the brazing alloy to not only penetrate the interstices 37 and 38, indicated in Fig. VIII, between the wall of the container and the reinforcements 19 and 29, but also to fillet the inner junctions of said elements, as indicated at 40 in Fig. VIII, and fillet the outer junctions of said elements, as indicated at 41 in said figure.

As above mentioned; it is the ordinary practice to provide such containers as indicated at 1 in Fig. I with a protective coating upon both the outside and the inside surface thereof, formed of an alloy known as "spelter" and which is principally zinc, and such coating, which is indicated at 42 in Fig. IX, is formed upon the container after immersing the latter in a detergent liquid which removes all grease and dirt from the metal of the structure and by then immersing the structure in a molten bath of the coating alloy. Thereupon, the container is removed from the coating bath and drained.

Each of the reinforced openings aforesaid having been inwardly converged, as above described, to the taper of a standard pipe thread; as the final step in my process, each of said openings is provided with a suitable pipe thread, such as indicated at 43 in Fig. IX.

It is to be understood that the bottom closure 4 may have a suitable opening therein provided with a reinforcement substantially as above described, for connection of the container with the pipe 8. Similarly, the wall of said container may be provided with the reinforced screw threaded socket 45 for connection with the pipe 9.

Although I have explained my invention with reference to the manufacture of a container of the range boiler type; it is to be understood that my improvements are equally applicable to containers of other types.

Therefore, I do not desire to limit myself to the precise details of construction, arrangement and procedure herein set forth, as it is obvious that various modifications may be made therein without departing from the essential features of my invention, as defined in the appended claims.

I claim:

1. In a container, the combination with a sheet metal wall having an opening therethrough; of two sheet metal reinforcements for said opening, including an inner annular reinforcing plate having a central opening smaller than the opening in said wall; the metal of said wall and of said reinforcement extending in coaxial tubular relation, in contact with each other; the tubular portion of the metal of said reinforcement extending within the tubular portion of the metal of said wall, and through said wall; an outer annular reinforcing plate dished so that its circular edge which is radially inward is axially outward with respect to said tubular portion of the container wall and fitted around the latter; the tubular portion of said reinforcement extending through said wall being expanded to a larger outside diameter than the inside diameter of the tubular portion of said wall; whereby said wall and both its reinforcements are interlocked; a film of brazing alloy extending between said reinforcements and said wall, integrally uniting them, and forming a bead at the ends of the tubular portions of said reinforcements and wall and forming a fillet at the junctions of the other edges of said reinforcements with said wall; a coating of zinc alloy extending over said wall and reinforcements; and an internal pipe screw thread formed in the tubular portion of said inner reinforcement which extends in said wall.

2. In a container, the combination with a sheet metal wall having an opening therethrough; of two sheet metal reinforcements for said opening, including an inner annular reinforcing plate having a central opening smaller than the opening in said wall; the metal of said wall and of said reinforcement extending in coaxial tubular relation, in contact with each other; the tubular portion of the metal of said reinforcement extending within the tubular portion of the metal of said wall, and through said wall; an outer annular reinforcing plate dished so that its circular edge which is radially inward is axially outward with respect to said tubular portion of the container wall and fitted around the latter; the tubular portion of said reinforcement extending through said wall being inwardly converged, to the taper of a pipe thread, and expanded to a larger outside diameter than the inside diameter of the tubular portion of said wall; whereby said wall and both its reinforcements are interlocked; a film of brazing alloy extending between said reinforcements and wall, integrally uniting them, and forming a bead at the ends of the tubular portions of said reinforcements and wall and forming a fillet at the junction of the other edges of said reinforcements with said wall; a coating of zinc alloy extending over said wall and reinforcements; and an internal pipe screw thread formed in the tubular portion of said inner reinforcement which extends in said wall.

3. In a container, the combination with a sheet metal wall having an opening therethrough; of two sheet metal reinforcements for said opening, including an inner annular reinforcing plate having a central opening smaller than the opening in said wall; the metal of said wall and of said reinforcement extending in coaxial tubular relation, in contact with each other; the tubular portion of the metal of said reinforcement extending within the tubular portion of the metal of said wall, and through said wall; an outer annular reinforcing plate fitted around said tubular portion of the container wall; the tubular portion of said reinforcement extending through said wall being expanded to a larger outside diameter than the inside diameter of the tubular portion of said wall; whereby said wall and both its reinforcements are interlocked; a film of metal extending between said reinforcements and said wall, integrally uniting them; a coating of metal extending over said wall and reinforcements; and an internal pipe screw thread formed in the tubular portion of said inner reinforcement which extends in said wall.

4. In a container, the combination with a sheet metal wall having an opening therethrough; of two sheet metal reinforcements for said opening, including an inner annular reinforcing plate having a central opening smaller than the opening in said wall; the metal of said wall and of said reinforcement extending in coaxial tubular relation, in contact with each other; the tubular portion of the metal of said reinforcement extending within the tubular portion of the metal of said wall, and through said wall; an outer annular reinforcing plate fitted around said tubular portion of the container wall; the tubular portion of said reinforcement extending through said wall being expanded to a larger outside diameter than the inside diameter of the tubular portion of said wall; whereby said wall and both its reinforcements are interlocked; a film of metal extending between said reinforcements and said wall, integrally uniting them.

5. In a container, the combination with a sheet metal wall having an opening therethrough; of two sheet metal reinforcements for said opening, including an inner annular reinforcing plate having a central opening smaller than the opening in said wall; the metal of said wall and of said reinforcement extending in coaxial tubular relation, in contact with each other; the tubular portion of the metal of said reinforcement extending within the tubular portion of the metal of said wall, and through said wall; an outer annular reinforcing plate fitted around said tubular portion of the container wall; the tubular portion of said reinforcement extending through said wall being expanded to a larger outside diameter than the inside diameter of the tubular portion of said wall; whereby said wall and both its reinforcements are interlocked.

6. In a container, the combination with a sheet metal wall having an opening therethrough; of two sheet metal reinforcements for said opening, including an inner annular reinforcing plate having a central opening smaller than the opening in said wall; the metal of said wall and of said reinforcement extending in coaxial tubular relation, in contact with each other; the tubular portion of the metal of said reinforcement extending within the tubular portion of the metal of said wall, and through said wall; an outer annular reinforcing plate fitted around said tubular portion of the container wall; the tubular portion of said reinforcement extending through said wall being expanded to a larger outside diameter than the inside diameter of the tubular portion of said wall; whereby said wall and both its reinforcements are interlocked; and an internal pipe screw thread formed in the tubular portion of said inner reinforcement which extends in said wall.

7. In a container, the combination with a sheet metal wall having an opening therethrough; of a metal reinforcement for said opening, including an inner annulus surrounding said opening; the metal of said wall and of said reinforcement extending outwardly in coaxial tubular relation; an outer annular metal reinforcement dished around said tubular portion of the container wall; the tubular portion of said inner reinforcement being inwardly converged to the taper of a pipe thread, and expanded to a larger outside diameter than the inside diameter of the tubular portion of said wall; whereby said wall and both its reinforcements are interlocked; a film of brazing alloy extending between said reinforcements and said wall, integrally uniting them; a coating of zinc alloy extending over said wall and reinforcements; and an internal pipe screw thread formed in the tubular portion of said inner reinforcement which extends in said wall.

8. In a container, the combination with a sheet metal wall having an opening therethrough; of a metal reinforcement for said opening, including an inner annulus surrounding said opening; the metal of said wall and of said reinforcement extending outwardly in coaxial tubular relation; an outer annular metal reinforcement dished around said tubular portion of the container wall; the tubular portion of said inner reinforcement being inwardly converged to the taper of a pipe thread, and expanded to a larger outside diameter than the inside diameter of the tubular portion of said wall; whereby said wall and both its reinforcements are interlocked; and an internal pipe screw thread formed in the tubular portion of said inner reinforcement which extends in said wall.

9. In a container, the combination with a sheet metal wall having an opening therethrough; of a metal reinforcement for said opening, including an inner annulus having a central opening smaller than the opening in said wall; the metal of said wall and of said reinforcement extending in coaxial tubular relation, in contact with each other; the tubular portion of the metal of said reinforcement extending within the tubular portion of the metal of said wall; an outer annular metal reinforcement dished so that its circular edge which is radially inward is axially outward with respect to said tubular portion of the container wall and fitted around the latter; the tubular portion of said reinforcement extending through said wall being inwardly converged to the taper of a pipe thread, and expanded to a larger outside diameter than the inside diameter of the tubular portion of said wall; whereby said wall and both its reinforcements are interlocked; and a film of brazing alloy extending between said reinforcements and said wall, integrally uniting them.

10. In a container, the combination with a sheet metal wall having an opening therethrough; of a metal reinforcement for said opening, including an inner annulus having a central opening smaller than the opening in said wall; the metal of said wall and of said reinforcement extending in coaxial tubular relation, in contact with each other; the tubular portion of the metal of said reinforcement extending within the tubular portion of the metal of said wall; an outer annular metal reinforcement dished so that its circular edge which is radially inward is axially outward with respect to said tubular portion of the container wall and fitted around the latter; the tubular portion of said reinforcement extending through said wall being inwardly converged to the taper of a pipe thread, and expanded to a larger outside diameter than the inside diameter of the tubular portion of said wall; whereby said wall and both its reinforcements are interlocked.

In testimony whereof, I have hereunto signed my name at Conshocken, Pennsylvania, this twenty-fourth day of July, 1923.

JOSEPH WILLIAM WINTER.

Witnesses:
MORRIS H. FELDMAN,
DAVID MOORE RAMSEY.